United States Patent [19]

Claesson

[11] Patent Number: 5,443,624
[45] Date of Patent: Aug. 22, 1995

[54] METHOD AND APPARATUS FOR INCREASING THE YIELD OF AN AIR-DRYING PROCESS

[75] Inventor: Knut Claesson, Stocksund, Sweden

[73] Assignee: Corroventa Avfuktning AB, Sollentuna, Sweden

[21] Appl. No.: 175,419

[22] PCT Filed: Aug. 25, 1992

[86] PCT No.: PCT/SE92/00585
§ 371 Date: Jan. 12, 1994
§ 102(e) Date: Jan. 12, 1994

[87] PCT Pub. No.: WO93/04764
PCT Pub. Date: Mar. 18, 1993

[30] Foreign Application Priority Data

Aug. 30, 1991 [SE] Sweden ............... 91 02488

[51] Int. Cl.⁶ .................................. B01D 41/00
[52] U.S. Cl. ........................ 95/113; 55/269; 55/338; 55/472; 95/115; 95/124; 95/288; 96/150
[58] Field of Search ............... 55/269, 338, 472; 95/39, 113, 114, 123, 124, 126, 288, 115; 96/144, 150, 218

[56] References Cited

U.S. PATENT DOCUMENTS

| | | | |
|---|---|---|---|
| 3,490,201 | 1/1970 | Colvin et al. | 95/123 |
| 3,847,578 | 11/1974 | Munters | 96/150 |
| 4,342,569 | 8/1982 | Hussmann | 95/124 |
| 4,729,774 | 3/1988 | Cohen et al. | 55/269 |
| 5,170,633 | 12/1992 | Kaplan | 95/113 |

FOREIGN PATENT DOCUMENTS

| | | |
|---|---|---|
| 335323 | 9/1968 | Sweden . |
| 462583 | 7/1990 | Sweden . |
| 1400255 | 7/1975 | United Kingdom . |

*Primary Examiner*—C. Scott Bushey
*Attorney, Agent, or Firm*—Sughrue, Mion, Zinn, Macpeak & Seas

[57] ABSTRACT

A method and apparatus for increasing the yield of an air-drying process with the aid of a dehumidifier 2 and a condenser/heat-exchanger 3 involves delivering wet regenerating air exiting the dehumidifier to one side of the condenser/heat-exchanger so as to deliver energy to the process air entering the other side. Condensation deriving from the regenerating air is collected and carried away, and the heated, dried process air 21 is delivered to the dehumidifier in which moisture is extracted from the air and the air further dried. The departing wet regenerating air may, after its delivery process, be led to the room, atmosphere or the flow of process air.

8 Claims, 3 Drawing Sheets

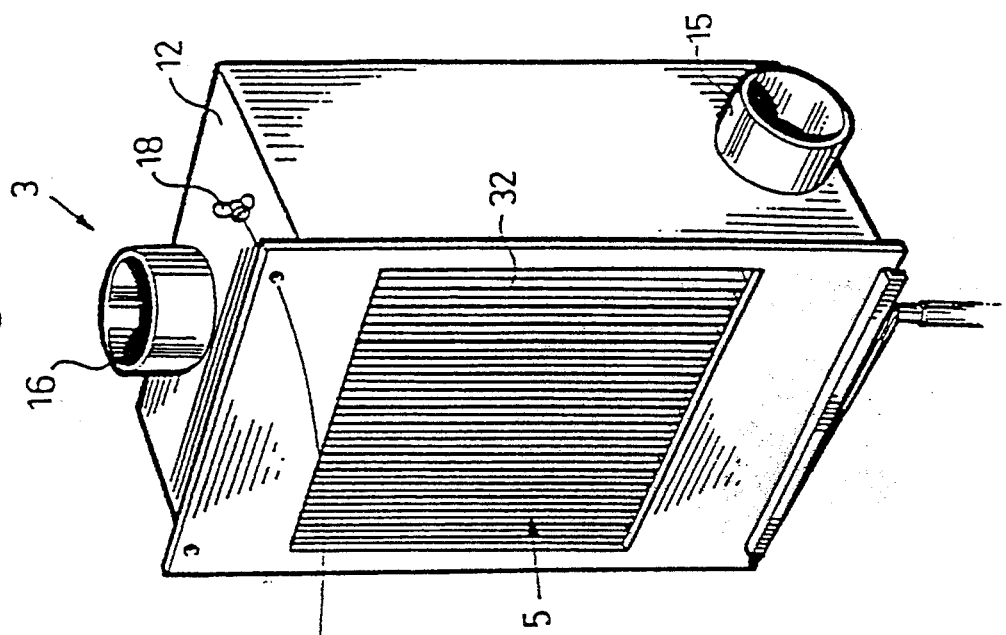
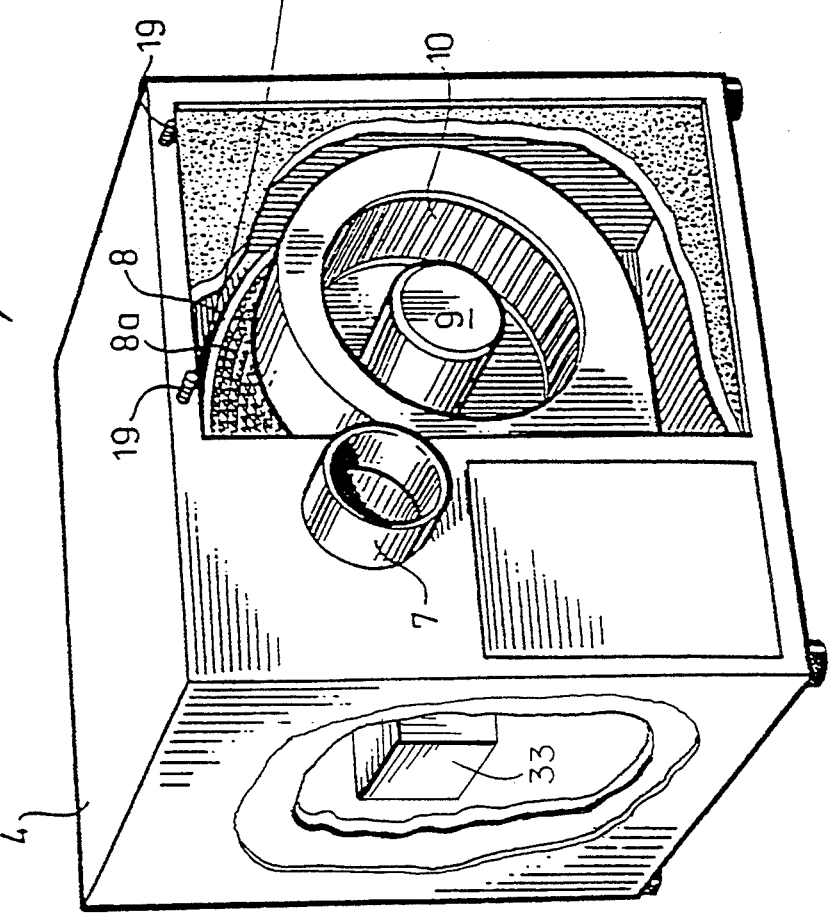

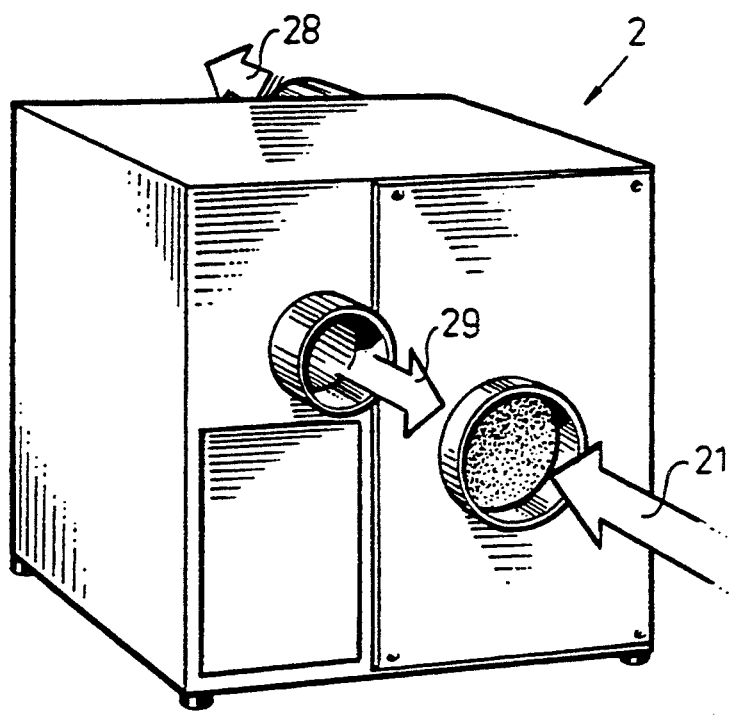
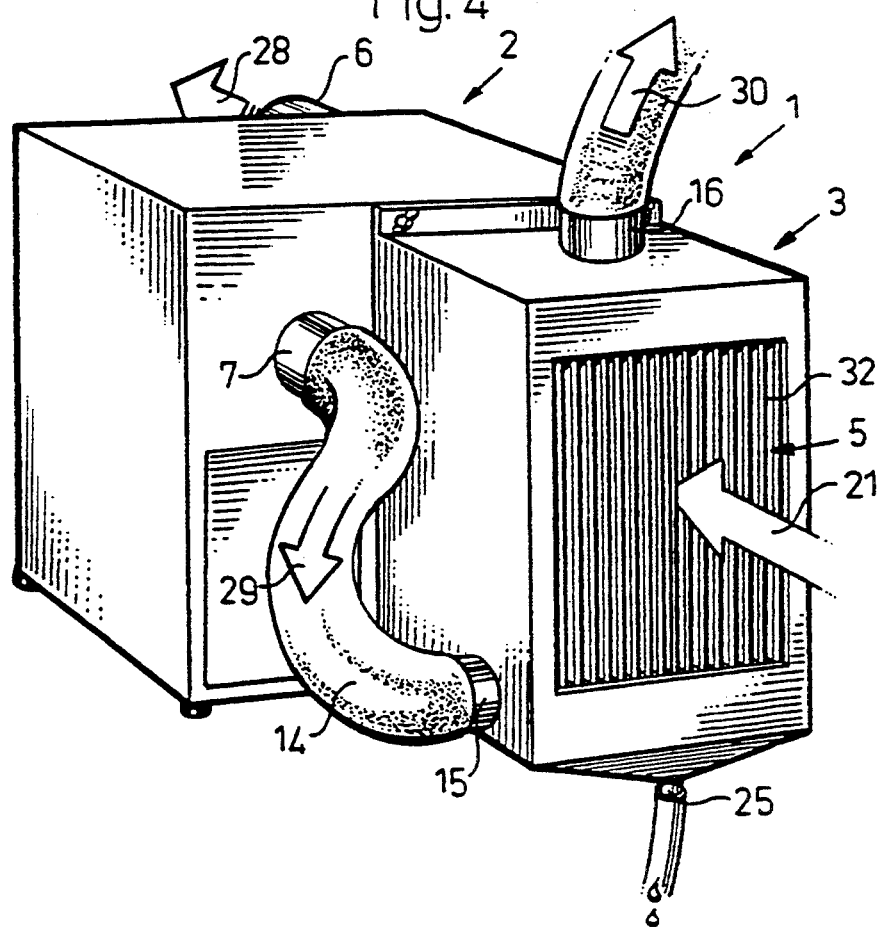

METHOD AND APPARATUS FOR INCREASING THE YIELD OF AN AIR-DRYING PROCESS

FIELD OF INVENTION

The present invention relates to a method of increasing the yield of an air-drying process in which fan-driven process air delivered to a dehumidifier is dehumidified and dried during a heat-exchange process with hot regenerating air.

The invention also relates to apparatus for carrying out the method.

One problem with methods and apparatus of this kind is that the moisture present in the wet air flow must be extracted and led away. This can normally be achieved by passing the wet air-flow to a room or to the surroundings, for example with the aid of a hose. There are cases, however, when this known technique can only be applied with difficulty and at relatively high costs, for instance when cellar air or the air in a bank vault shall be dehumidified and dried.

This problem is normally solved by connecting a condenser to a dehumidifier.

In principle, a condenser is a heat-exchanger in which wet air is brought into heat-exchange contact with cold air, therewith extracting and collecting the moisture in the wet air while heating the cold air delivered to the heat exchanger.

In practice, the wet air that exits from the dehumidifier may have a temperature of about 35° C. and may also contain a large amount of moisture. The cold air used is air at room temperature, e.g. 20° C., which causes the moisture in the wet, warm regenerating air delivered to the heat-exchanger to condense on the other side of the heat-exchanger.

The dehumidified air is then passed back to the dehumidifier, in which it is heated and used to regenerate the wet rotor.

STATE OF THE ART

In known methods and apparatus of this kind, the condenser/heat-exchanger unit is completely separate from the dehumidifier. The condenser/heat-exchanger unit may thus have a separate cold-air fan and also a separate electric plug or like connector, etc. These two units are relatively bulky and heavy to handle, even when having a relatively limited capacity.

The cost of one such condenser together with associated conduits is also high, and a system of relatively limited capacity will, today, cost at least $1,300.

One example of the present standpoint of techniques is described in SE,B,335.323 (Munters). According to the teachings of this publication, the energy is not delivered to the air to be dried, but to a separate cooling fluid.

Another method and apparatus herefor are described in GB,B,1.400.255 (British Titan). This method utilizes, among other things, first and second columns, a condenser, a fan, and a heater in a drying process. As in the former case, energy is not delivered from the wet air to the process air to be dried.

OBJECT OF THE INVENTION

The object of the present invention is to provide a method and apparatus by means of which an increase in the yield of the energy delivered to the process can be achieved and which will also facilitate handling of the apparatus components.

Another object is to provide process-air drying apparatus which has fewer components than known apparatus intended for the same purpose, and which has a simpler and more compact construction than previously known apparatus of this kind.

Another object of the invention is to provide an air-drying method and air-drying apparatus in which regeneration air departing from a dehumidifier is used more economically than is the case in earlier known methods and apparatus of the aforesaid kind.

SUMMARY OF THE INVENTION

These and other objects are fulfilled by an inventive method having generally the characteristic features set forth below.

Thus, in accordance with the invention, the process air to be dried is heated with the aid of energy delivered from the wet regenerating air. Consequently, the dry air that exits from the dehumidifier will have a relative moisture content that is substantially lower than the moisture content of air dried by a conventional drying method.

The inventive method is also much more economical than the known methods, partly because of the improved heat economy, but also because the inventive drying process can be performed in apparatus which comprise fewer components than known apparatus of this kind.

Thus, in practice, the two main apparatus parts, namely the dehumidifier and the condenser/heat-exchanger are comprised of two separate, relatively lightweight units (together weighing about 28 kg as against a normal weight of about 50 kg) which can be readily carried to a user site and assembled together to form a complete system, using only a few simple manual manipulations.

A condenser of this kind coupled to a dehumidifier, e.g. according to U.S. Pat. No. 5,147,420 Corroventa with an air throughflow volume of about 300 m³/h, and a regenerating battery of 1,500 w, has a water extraction capacity of about 15 kg/day (twenty-four hours) at 20° C. and a 50% relative humidity. The warm, dry air has a drying capacity which is about 80% better than the capacity of the same dehumidifier which has no condenser/heat-exchanger, which, in turn, almost halves the drying time.

Thus, it is preferred in practice that the wet regenerating air is drawn into the condenser/heat-exchanger by means of the same fan as that which draws the process air into the dehumidifier. This obviates the need for one fan and its associated electric cables and other components.

The regenerating air exiting from the condenser/heat-exchanger can be led away or recovered and processed in different ways, according to prevailing requirements and needs. For example, the regenerating air may be subjected to a heat-emitting and water-condensing process and then delivered to the room in which air shall be dried.

Alternatively, the regenerating air can be subjected to a heat-emitting and water-condensing process and then either passed to a ventilation system or conducted to a location, e.g. atmosphere, outside the room in which the air has been dried.

Another alternative is to deliver regenerating air to the flow of process air, subsequent to condensing the moisture in the regenerating air.

Still another alternative is to deliver exiting wet air to incoming regenerating air by means of a separate fan. In this case, however, the system requires the provision of an additional fan in comparison with what is required in other, normal cases.

BRIEF DESCRIPTION OF THE DRAWINGS

The invention will now be described in more detail with reference to some exemplifying embodiments thereof and also with reference to the accompanying drawings, in which FIG. 1 is a partly cut-away, perspective view of an air-dehumidifier included in the inventive system;

FIG. 2 is a perspective view of a condenser/heat-exchanger for connection to the air-dehumidifier illustrated in FIG. 1;

FIG. 3 is a perspective view of an air-dehumidifier shown in FIG. 1, wherein arrows show the various air flows delivered to and exiting from the dehumidifier;

FIG. 4 is a perspective view of the inventive system in use;

BEST MODE OF CARRYING OUT THE INVENTION

Figure 5:
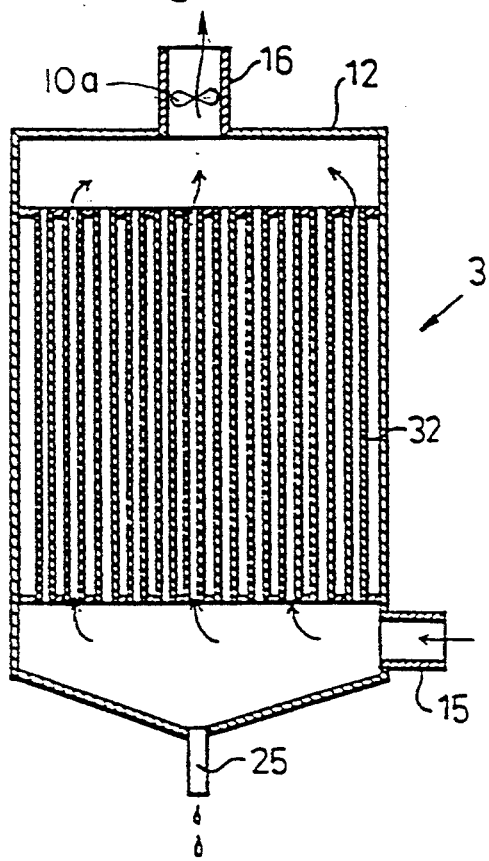
FIG. 5 is a view from the inside of a first embodiment of a condenser/heat-exchanger of the system illustrated in FIGS. 1–4.

The air-drying system 1 illustrated in FIGS. 1–4 comprises an air-dehumidifier 2 and a condenser/heat-exchanger 3. The air-dehumidifier 2 is of a more or less conventional kind and comprises a housing or casing 4 provided with a process-air inlet 5 and a dry-air outlet 6. The dehumidifier also includes an outlet 7 for wet regenerating air.

Journalled for rotation within the housing 4 is a rotor 8 which is provided with channels 8a which contain moisture adsorbing means, for instance silica gel crystals. Although not shown, the housing 4 houses an electric motor for driving the rotor 8 and a concentrically mounted impeller or fan 10, which is driven by an electric motor 9.

The fan 10 functions to pressurize process air delivered through the inlet 5, so that the air will flow through at least a part of the rotor 8 and, subsequent to being dehumidified, depart through the outlet 6.

The housing 4 also houses heating means (33), schematically illustrated in FIG. 1, which heats regenerating air that passes through another part of the rotor, as disclosed in detail in my U.S. Pat. No. 5,147,420.

The illustrated embodiment may also include separate capturing devices (not shown), for instance comprising a hood (not shown) positioned closely adjacent the rotor 8 on its low-pressure side and provided with heat-emitting devices (not shown) which deliver radiant heat in an axial direction and directly onto the moisture-adsorbing means present in the rotor channels 8a.

Alternatively, the regenerating air can be delivered to the housing through a separate inlet (not shown) and heated within the housing 4 in some suitable manner.

The condenser/heat-exchanger 3 illustrated in FIG. 2 comprises a generally four-cornered box 12 in which lamellar 32 are arranged between which heat-exchange is effected between wet regenerating air, delivered from the outlet 7 of the air-dehumidifier through a hose or pipe 14 and process air delivered centrally to the condenser/heat-exchanger. The condenser/heat-exchanger is provided with an inlet 15 and an outlet 16. The condenser/heat-exchanger can be fitted removably to the air-dehumidifier 2 and secured thereto with the aid of wing nuts 18 which coact with screws 19 on the front side of the dehumidifier 2, i.e. in the same manner as that now proposed in the case of filter flaps which are replaced with condenser/heat-exchanger.

Thus, wet regenerating air exiting from the outlet 7 of the dehumidifier 2 is delivered to the inlet 15 of the condenser/heat-exchanger, via the hose 14, for the purpose of delivering energy to the process air, which is delivered to the front side of the unit, as shown by the arrow 21.

The process air is therewith used for cooling purposes and will be slightly heated as it takes up energy from the wet regenerating air, the liquid contained therein condensing and collecting on the bottom of the condenser/heat-exchanger 3 from where it can be removed through a pipe 25. The slightly heated and dried process air then enters the dehumidifier 2, in which the air is dehumidified and further dried during its passage through the rotor channels 8a.

In order to make the condenser more effective, a number of cells can be coupled sequentially so that the efficiency of the condenser will correspond to a contra-flow heat-exchanger, despite each cell operating in crossflow. The efficiency is greatly improved even when only two cells are coupled.

The wet regenerating air is drawn into the condenser/heat-exchanger by means of the same fan 10 as that which draws the process air into the dehumidifier.

Figure 6:
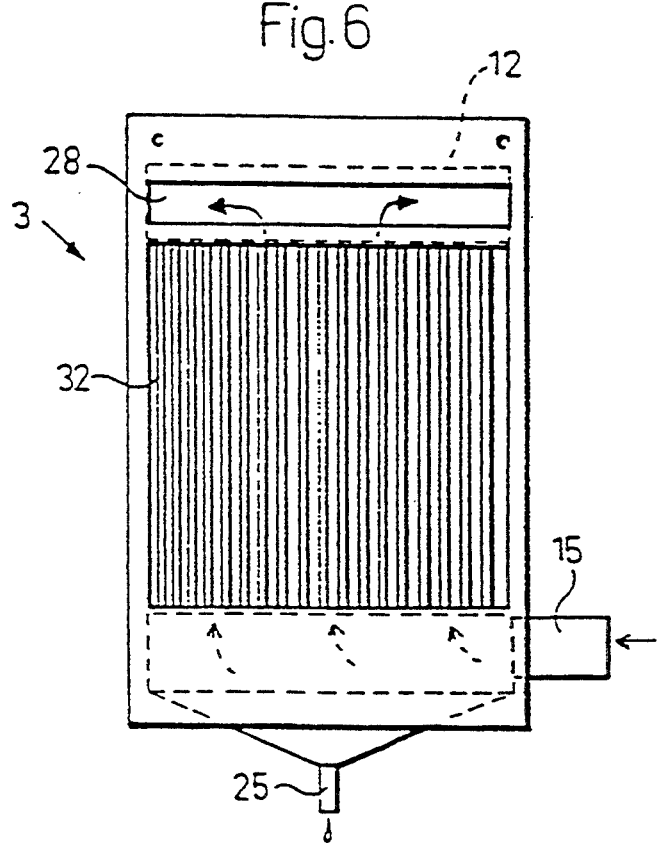
FIG. 6 is a view corresponding to the view of FIG. 5, showing an alternative embodiment of the condenser/heat-exchanger.

FIGS. 5 and 6 illustrate different ways of conducting away the wet regenerating air subsequent to its delivery of heat in the condenser/heat-exchanger 3.

In the FIG. 5 illustration, the regenerating air exiting from the outlet 16 is delivered to the room, or space, in which air is dried by means of the inventive system.

FIG. 6 illustrates a modified embodiment in which, subsequent to condensation, the regenerating air is delivered to the flow of process air through the slot or gap 28.

If two cells are provided, this air flow can be delivered to the flow of process air between the two cells, subsequent to passage through the condenser and condensing of the moisture present in said air flow.

Although not shown, the regenerating air may alternatively be delivered to a ventilation system or, for instance, to atmosphere outside the dried room, through a pipe or hose intended therefor.

According to a further alternative, the departing wet regenerating air may be delivered to incoming regenerating air through the medium of a separate fan (10a), as schematically illustrated in FIG. 5. Although this arrangement provides the best heat yield, it also requires the provision of two fans, in order to function in the manner intended.

The prevailing air flows are shown in the various Figures of the drawings by appropriate arrows. As before mentioned, the arrow 21 indicates process air drawn into the system. The arrow 28 indicates dry air exiting from the air-dehumidifier, while the arrow 29 indicates wet regenerating air exiting from the dehumidifier. In FIG. 4, the arrow 30 indicates the delivery of regenerating air to the room concerned or to the surroundings, subsequent to heat exchange with the process air.

Other modifications are conceivable within the scope of the inventive concept, as defined in the following claims.

I claim:

1. A method of increasing the yield of an air-drying process in which fan-driven process air is delivered to a dehumidifier and there dehumidified and dried during heat-exchange with heated regenerating air, comprising the steps of:
   a) delivering relatively moist, heated regenerating air exiting from the dehumidifier to one side of a condenser/heat-exchanger so as to deliver heat to the process air delivered to another side of said condenser/heat-exchanger and to cool the regenerating air;
   b) collecting and carrying away condensation obtained from the regenerating air; and
   c) delivering the process air heated and relatively dried in the condenser/heat-exchanger to the dehumidifier so as to extract moisture from the process air and further dry said process air.

2. A method according to claim 1, wherein the regenerating air is drawn into the condenser/heat-exchanger with a same fan as that used to draw process air into the dehumidifier.

3. A method according to claim 1, wherein the regenerating air is delivered to room in which air is to be dried, subsequent to subjecting the regenerating air to a heat-exchange and moisture-condensating process.

4. A method according to claim 1, wherein regenerating air is delivered, subsequent to a heat-exchange and moisture-condensating process, to a ventilation system or conducted to a location externally of a room whose air is to be dried.

5. A method according to claim 1, wherein the regenerating air is subjected to a condensing process and then delivered to the flow of process air.

6. A method according to claim 1, wherein exiting moist air is delivered to incoming regenerating air with a separate fan.

7. An air-drying system comprising an air-dehumidifier (2), and including:
   a) a housing (4) provided with an inlet (5) and an outlet (6);
   b) a rotor (8) journalled in the housing (4) and provided with channels (8a) or beds containing moisture absorbent means;
   c) a motor for driving the rotor (8);
   d) a fan (10) for pressurizing process air entering through the inlet, so that said air will flow through at least one part of the rotor and, subsequent to being dehumidified, depart through the outlet;
   e) means for heating regenerating air which passes through another part of the rotor; and
   f) a moist regenerating-air outlet (7); wherein the system further includes:
   g) a condenser/heat-exchanger (3) having lamellar (32) for effecting an exchange of heat between moist regenerating air (29) and incoming process air (21);
   h) an outlet for process air exiting from the condenser/heat-exchanger, said outlet adapted to be connected to the inlet of the air-dehumidifier;
   i) conduit means (14) for connecting a moist regenerating air-inlet (15) of the condenser/heat-exchanger to the moist regenerating-air outlet (7) of the air-dehumidifier;
   j) an outlet (16) for regenerating air which has been subjected to a heat-exchange with said incoming process air;
   k) means (18, 19) for connecting the condenser/heat-exchanger (3) to the air-dehumidifier (2); and
   l) means (25) for collecting and carrying away condensation from the condenser/heat-exchanger.

8. A system according to claim 7, wherein the fan (10) is disposed to draw incoming process air (21) through the condenser/heat-exchanger.

* * * * *